US011603808B2

(12) United States Patent
Pouring

(10) Patent No.: US 11,603,808 B2
(45) Date of Patent: Mar. 14, 2023

(54) ENGINE MANAGEMENT SYSTEM AND METHOD

(71) Applicant: SONEX RESEARCH, INC., Annapolis, MD (US)

(72) Inventor: Andrew Pouring, Edgewater, MD (US)

(73) Assignee: SONEX RESEARCH, INC, Annapolis, MD (US)

( * ) Notice: Subject to any disclaimer, the term of this patent is extended or adjusted under 35 U.S.C. 154(b) by 0 days.

(21) Appl. No.: 17/173,974

(22) Filed: Feb. 11, 2021

(65) Prior Publication Data

US 2021/0246845 A1  Aug. 12, 2021

Related U.S. Application Data

(60) Provisional application No. 62/975,513, filed on Feb. 12, 2020.

(51) Int. Cl.
| | |
|---|---|
| *F02D 41/14* | (2006.01) |
| *F02D 41/00* | (2006.01) |
| *F02D 41/40* | (2006.01) |
| *F02F 3/26* | (2006.01) |
| *F02D 13/02* | (2006.01) |

(52) U.S. Cl.
CPC .......... *F02D 41/146* (2013.01); *F02D 13/02* (2013.01); *F02D 41/0002* (2013.01); *F02D 41/009* (2013.01); *F02D 41/0047* (2013.01); *F02D 41/1452* (2013.01); *F02D 41/403* (2013.01); *F02F 3/26* (2013.01); *F02D 2200/021* (2013.01); *F02D 2200/0406* (2013.01); *F02D 2200/0414* (2013.01); *F02D 2200/0614* (2013.01); *F02D 2200/10* (2013.01)

(58) Field of Classification Search
CPC .. F02D 13/02; F02D 41/0002; F02D 41/0047; F02D 41/009; F02D 41/1452; F02D 41/403; F02D 2200/0406; F02D 2200/0414; F02D 2200/0614; F02D 2200/021; F02D 2200/10; F02F 3/26
USPC ................ 123/273, 276, 279, 280, 298, 299
See application file for complete search history.

(56) References Cited

U.S. PATENT DOCUMENTS

| | | | |
|---|---|---|---|
| 4,898,135 A | 2/1990 | Failla et al. | |
| 5,224,449 A * | 7/1993 | Fukano | ............... F02B 23/0618 123/267 |

(Continued)

OTHER PUBLICATIONS

Blank et al., "Methanol Combustion in Low Compression Ratio D.I. Engines Enabled by Sonex Piston Design," Journal of Engines, vol. 110, Section 3, publication date unknown, but at least before Dec. 31, 2001, pp. 1234-1252.

(Continued)

*Primary Examiner* — John Kwon
*Assistant Examiner* — Johnny H Hoang
(74) *Attorney, Agent, or Firm* — Workman Nydegger

(57) ABSTRACT

An engine management system and method may include a control system and method for controlling an internal combustion engine. The internal combustion engine may be a direct-injection engine using a Sonex Controlled Auto-Ignition ("SCAI") combustion path. The control system and method may utilize fuel injection pressure, timing of start and end of injection, management of turbo airflow, fuel supplied, and other factors to provide reduced emissions and improved performance.

18 Claims, 7 Drawing Sheets

(56) References Cited

U.S. PATENT DOCUMENTS

| | | | | |
|---|---|---|---|---|
| 5,322,042 | A * | 6/1994 | di Priolo | F02B 19/16 123/263 |
| 5,862,788 | A * | 1/1999 | Pouring | F02B 21/00 123/276 |
| 6,178,942 | B1 * | 1/2001 | di Priolo | F02B 23/0627 123/273 |
| 7,128,063 | B2 | 10/2006 | Kang | |
| 8,443,716 | B2 * | 5/2013 | Keller | F02B 23/0633 92/231 |
| 2007/0137611 | A1 * | 6/2007 | Yu | F02D 41/3047 123/304 |
| 2007/0235002 | A1 * | 10/2007 | Blank | F02B 19/12 123/305 |
| 2009/0126461 | A1 * | 5/2009 | Liu | G01L 23/225 73/35.08 |
| 2010/0023277 | A1 * | 1/2010 | Liu | F02D 35/021 702/35 |
| 2012/0070883 | A1 * | 3/2012 | Ward | C12M 29/14 435/283.1 |

OTHER PUBLICATIONS

Blank et al., "Radical Ignition in Low Compression Ratio D.I. Engines Enabled by Sonex Piston Design," Sonex Research, Inc., Jan. 31, 2001, 14 Pages.

Blank et al., "NOx Reduction Kinetics Mechanisms and Radical-Induced Autoignition Potential of EGR in I.C. Engines using Methanol and Hydrogen," Society of Automotive Engineers, Inc., publication date unknown, but at least before Dec. 31, 2001, 15 Pages.

Rogers et al., "The Reduction of Soot Emissions by the use of a Piston with Micro-Chambers on a Medium Duty Diesel Engine," Society of Automotive Engineers, Inc., publication date unknown, but at least before Dec. 31, 2001, 10 Pages.

Blank et al., "Frozen Equilibrium and EGR Effects on Radical-Initiated H2 Combustion Kinetics in Low-Compression D.I. Engines using Pistons with Micro-Chambers," Journal of Fuels and Lubricants, vol. 112, Section 4, publication date unknown, but at least before Dec. 31, 2003, pp. 927-944.

Blank, "CNG / Methane-Combustion Kinetics (without N2) and Frozen Equilibrium in Radical-Ignition Reduced Compression Ratio D.I. Diesel Engines using Pistons with Micro-Chambers," Journal of Fuels and Lubricants, vol. 113, Section 4, publication date unknown, but at least before Dec. 31, 2004, pp. 742-763.

Blank, "Methanol Hypergolic Combustion Kinetics (without N2) and Frozen Equilibrium in Radical-Ignition Reduced Compression Ratio D.I. Engines Using Piston Micro-Chambers," Society of Automotive Engineers, Inc., publication date unknown, but at least before Dec. 31, 2004, 17 Pages.

Blank et al., "Radical Controlled Autoignition at Reduced Compression Ratios in a Hydrogen D.I. Diesel," Journal of Engines, vol. 113, Section 3, pp. 1165-1182.

Dempsey et al., "A Perspective on the Range of Gasoline Compression Ignition Combustion Strategies for High Engine Efficiency and Low NOx and Soot Emissions: Effects of In-Cylinder Fuel Stratification," International Journal of Engine Research, vol. 17, No. 8, Nov. 19, 2015, pp. 897-917.

Keating et al., "Internally Regenerative Engine Cycle Analysis; A Parametric Study," The American Society of Mechanical Engineers, Nov. 13-18, 1983, 14 Pages.

Kitamura et al., "Mechanism of Smokeless Diesel Combustion with Oxygenated Fuels based on the Dependence of the Equivalence Ratio and Temperature on Soot Particle Formation," International Journal of Engine Research, vol. 3, No. 4, Jul. 30, 2002, pp. 223-248.

Pouring, "Overview of SONEX Controlled Auto Ignition-SCAI-Process for Directed Injected Engines," SONEX Research, Inc., Apr. 30, 2015, 11 Pages.

Chen, "DNS of Turbulent Combustion in Complex Flows," 2018 Purdue Engineering Distinguished Lecture Series, retrieved from https://www.youtube.com/watch?v=-EU8JW4XWXw%2C+2-1-2019.&feature=youtu.be, Feb. 1, 2019.

* cited by examiner

ENGINE MANAGEMENT SYSTEM AND METHOD

FIELD OF THE DISCLOSURE

This disclosure relates to a control system and method for operating a combustion engine, particularly a combustion chamber configuration for a reciprocating direct-injected four-cycle internal combustion engine, for improving performance and minimizing production of $CO_2$, NOx, UHC and CO emissions.

BACKGROUND

Automobiles that include an internal combustion engine accounted for over 90% of new-automobile sales in 2019, despite the rising popularity of alternative-fuel vehicles like electric vehicles and fuel-cell-based vehicles. The proportion of internal combustion engines in aircraft is also high. Of general concern in internal combustion engines is efficiency, with an average efficiency of a gasoline combustion engine only around 20%. Diesel engines generally may reach only 40%, so the production of emissions, including carbon dioxide ($CO_2$), nitrogen oxides (NOx), unburned hydrocarbons (UHC), carbon monoxide (CO), and others from internal combustion engines continue to pose significant environmental consequences and risks.

Existing internal combustion engines comprise pistons that cooperate with various components such as a crankshaft, exhaust camshaft, inlet camshaft, connecting rod, spark plug, valves, and engine block defining a combustion chamber to convert chemical energy from combusted fuel into useful work. Generally, an internal combustion engine may be a four-stroke or a two-stroke engine which determines the operation of the basic components to translate the chemical energy into useful work. For example, a four-stroke engine comprises the basic steps of 1) allowing air and fuel to enter the combustion chamber, 2) compressing the air and fuel as the piston moves upward to reduce the combustion chamber volume, with ignition of the combustion gases occurring at a predetermined point or condition usually under the influence of a spark plug, 3) moving the piston downward against the pressure of the combustion gases, and 4) expelling the combustion gases as the piston moves upward.

Two-stroke engines, by contrast, comprise 1) a power stage in which the piston moves downward against the pressure of combustion gases, during which time blowdown occurs, and 2) a compression stage subsequently serves to compress additional fuel and air for subsequent ignition. This may be characteristic of a diesel-combustion mode which does not require spark ignition as with four-stroke gasoline engines. Direct-injection engines are distinct in that the fuel is squirted directly into the combustion chamber instead of mixing with air in an intermediate air-intake manifold, this serving to improve efficiency by combusting more efficiently because of a leaner fuel-air ratio and maximizing the amount of fuel that is combusted. Direct injection may be used in suitable two-stroke or four-stroke engines.

Efforts have been made to manage operation of direct-injection internal combustion engines for improved efficiency, lower emissions, and etc. For example, homogeneous-charge compression ignition ("HCCI") and precise combustion-controlled ignition ("PCCI") generally form a third type of ignition that is based on temperature-dependent chemistry. That is, whereas in classical spark-ignition and diesel-combustion modes a flame may progress or propagate through the charge (i.e. the mixture of air and fuel in or entering the combustion chamber), the third approach (comprising HCCI and PCCI) utilizes simultaneous envelopment of an increased proportion or an entirety of the charge, and aims thereby to improve stability, uniformity, and cycle-to-cycle repeatability of the burn. Unfortunately, this third type of ignition is only advantageous to the extent that it can be effectively controlled, which remains an outstanding problem in the field. Further, because HCCI relies on thermally activated ignition, it is not suitable with low-temperature applications.

Another approach to or variation on direct-injection engines is the use of pistons containing micro-chambers with at least one connecting vent as discussed in U.S. Pat. No. 5,862,788, granted Jan. 26, 1999, and U.S. Pat. No. 6,178,942, granted Jan. 30, 2001, each reference belonging to the assignee of the present disclosure and incorporated herein in its entirety by reference. As described therein, pistons that comprise micro-chambers with at least one connecting vent allow combustion to follow two distinctive paths and thereby improve combustion through a combination of chemical and fluid dynamic effects. A first path is described in U.S. Pat. No. 5,862,788, referred to herein as the Low Soot Diesel Design ("LSDD"), with enables soot reductions of up to 90% in standard direct-injection diesel engines at compression ratios greater than 16:1, but does not result in significant reductions of NOx. The second path is described in U.S. Pat. No. 6,178,942, and discusses providing micro-chambers on pistons to improve combustion in laboratory settings. However, real-world application is limited by the need for improved control means. The path described above is known as the Sonex Controlled Auto-Ignition ("SCAI") path, and pertains to compression ratios of less than 16:1.

SCAI differs substantially from HCCI in that whereas SCAI enables a low-temperature (150° C.-200° C. less than HCCI), fuel-independent (octane and cetane rating not pertinent) decomposition process that involves chemical species retained in frozen equilibrium from a previous engine cycle, HCCI rather pertains to a thermally activated ignition relying on substantially higher compression and temperature, depends on the fuel because it depends on oxidation of the fuel (rather than decomposition), and is not related to events of a previous cycle. As a result, SCAI is highly controllable relative to the start and rate of combustion, whereas HCCI is difficult to control.

This allows SCAI to be operable over the entire engine map and to have reduced emissions: CO emissions are approximately 0.01%, NOx, HC in single-digit parts per million, and $CO_2$ emissions are approximately 86%. The NOx emissions alone are approximately 90% less than stoichiometric amounts. By contrast, the chain-initiation of HCCI is specific to the fuel oxidation temperature and therefore depends on the octane or cetane rating, requires exhaust gas recirculation, is only operable over part of the engine map, and emissions are disadvantaged relative to SCA. For example, HCCI CO emissions are approximately 0.1%, i.e. an order of magnitude larger than SCA, and NOx is stoichiometric.

In view of the foregoing, while the benefits of SCA are substantial, effective control of an engine utilizing SCAI remains elusive. Accordingly there remains a need for an improved control system and method to allow SCAI to be implemented in real-world applications.

SUMMARY

The engine management system and method embodiments of the present disclosure provide an improved control system particularly applicable to direct-injection internal combustion engines and enabling the use of Sonex Controlled Auto-Ignition ("SCAI") to reduce emissions and improve performance of an internal combustion engine. The control system and method of using the same according to the embodiments of the present disclosure enables the creation of a global low-temperature decomposition chemical reaction producing maximum in-cylinder temperature below that required for generating nitrogen oxides and at a fuel/air ratio composition below that required for forming soot particulates.

A general reaction that is controlled by the control system and method embodiments of the engine management system may result in:

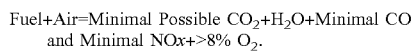

Fuel+Air=Minimal Possible $CO_2$+$H_2O$+Minimal CO and Minimal NOx+>8% $O_2$.

That is, the control system and method of embodiments of the present disclosure may minimize the production of $CO_2$, CO, and NOx emissions while maintaining a desired minimal threshold of 02. This is accomplished by ensuring the thermal decomposition of fuel to facilitate combustion at a predetermined crank angle location and time such that combustion remains, under all dynamic operating conditions, within predetermined boundaries of equivalence ratio and temperature as described herein.

The control system and method of embodiments of the present disclosure may be configured with stored test-optimized parameters and may ensure that during the engine cycle, piston micro-chamber cool flame outflow of decomposition products (including chemical radicals) causes in-cylinder global radical ignition after top-dead-center ("TDC") with minimized flame front. This may be done in air/fuel compositions greater than a stoichiometric amount, such as greater than 26.5:1. The control system and method of embodiments of the present disclosure may control a peak cylinder combustion pressure to occur at the optimal crank angle location by controlling one or more of the following factors: air-fuel ratio from stoichiometric to ultra-lean conditions, control of idle speed and other speeds, variable valve timing, electronic valve control, main fuel injection pressure, fuel rate, timing of start and end of injection and pilot, pilot injection, intake manifold air pressure and temperature, and exhaust gas recirculation, to convert minimal fuel quantity into useful work stably and in minimal time. This may be configured to reduce fuel consumption and to produce $H_2O$ and minimal amounts of $CO_2$, NOx, UHC, CO.

The control system and method embodiments address the problem of existing engines lacking a reliable, repeatable, and dynamic electronic fuel injection ("EFI") control process that operates during each engine cycle and manages turbo air flow and fuel supplied by direct injection to the combustion chamber, this ensuring that the injector spray impingement and quantity is suited to the micro-chambers. Further, the micro-chambers and the vents thereof can be used to provide input to the control system.

The control system and method of embodiments of the present disclosure may utilize any suitable instrument or combination of instruments to determine a control adjustment, such as thermocouples, pressure transducers, fuel flow meters, rpm meters, air flow indicators, lambda sensors (e.g. for $O_2$ content), and others. The values gathered from such instruments may be stored as maps from tests as functions of various factors.

For example, the manifold absolute pressure, manifold air temperature, intake air temperature, instant engine load, exhaust gas temperature, mass of air flow, mass of fuel flow, crank shaft and/or crank angle position, cam shaft position, engine coolant temperature, and oxygen content can be monitored by one or more sensors as deemed suitable. Data from the instrument or collection of instruments may be collected, tracked, and utilized over time to improve the process control and performance of an internal combustion engine.

The control system and method of embodiments may further comprise a control unit configured to provide any suitable process control scheme, including feedback control, feedforward control, proportional control, integral control, derivative control, proportional-integral control, proportional-derivative control, integral-derivative control, combinations thereof, or otherwise may be utilized by the controller to determine a suitable process condition based on a detected process-condition change. The design of the control system may be closed-loop or open-loop as deemed suitable.

The control system may utilize experimentally determined optimum initial and operational stored look-up tables or maps so as to control the plurality of factors to maintain the engine within the prescribed temperature (e.g., =1000K) and equivalence ratio (e.g., <0.56) limits.

The controller may comprise a processor, storage, I/O interfaces, and other suitable components for receiving signals from the instrument or combination of instruments, determining a process-condition change, determining a change to a controlled parameter such as injector timing, injector pressure, and/or injector spray coverage, and/or adjusting a number and timing of injector pulses, to cite just a few examples. The controller may comprise a special-purpose non-transitory computer-readable storage medium comprising instructions executable by a computing system of the engine management system to cause the system to perform one or more steps described herein. The storage medium may be or comprise a storage module configured to store at least one experimental datum used to determine the one or more engine outputs.

By providing a control system and method according to the disclosed embodiments, it is ensured that thermal decomposition of the fuel enables combustion at a predetermined crank angle location and time such that combustion remains within predetermined equivalence ratio and temperature boundaries as described in greater detail herein.

The numerous other advantages, features, and functions of embodiments of a control system and method will become readily apparent and better understood in view of the following description and accompanying drawings.

BRIEF DESCRIPTION OF THE DRAWINGS

The drawing figures are not necessarily drawn to scale, but instead are drawn to provide a better understanding of the components thereof, and are not intended to be limiting in scope, but to provide exemplary illustrations. The figures illustrate exemplary configurations of a control system and method, and in no way limit the structures or configurations of a control system and method according to the present disclosure.

DETAILED DESCRIPTION OF VARIOUS EMBODIMENTS

A. Overview

Figure 1A:
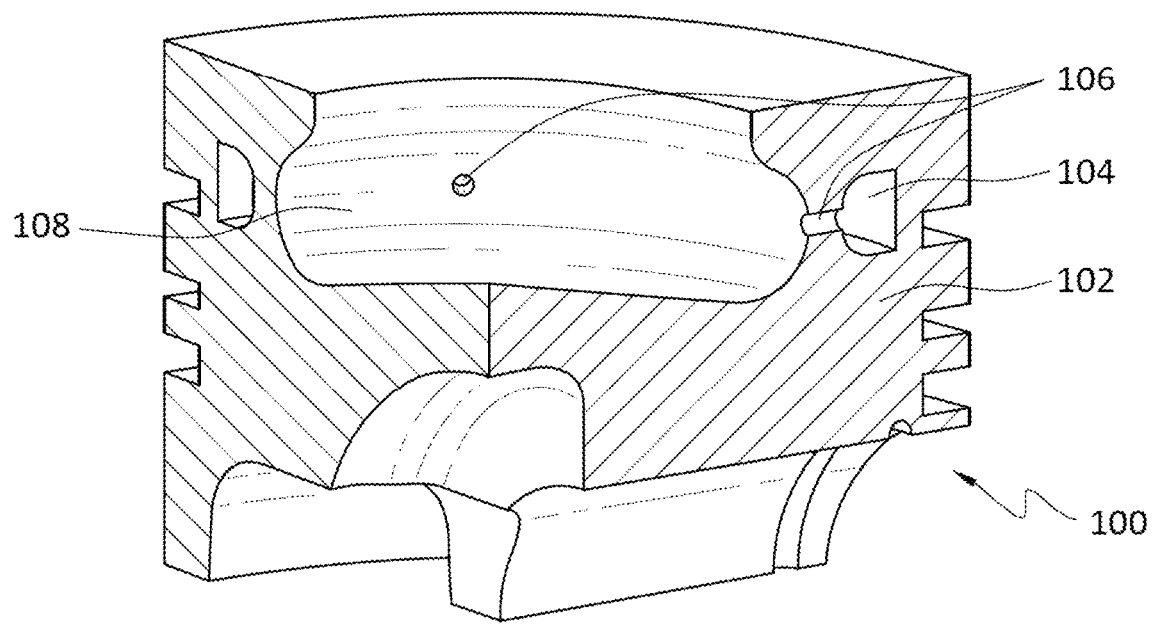
FIG. 1A is a perspective cutaway view showing a piston comprising micro-chambers having at least one vent according to an embodiment.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that, unless a term is defined to possess a described meaning, there is no intent to limit the meaning of such term, either expressly or indirectly, beyond its plain or ordinary meaning.

B. Various Embodiments

Figure 1B:
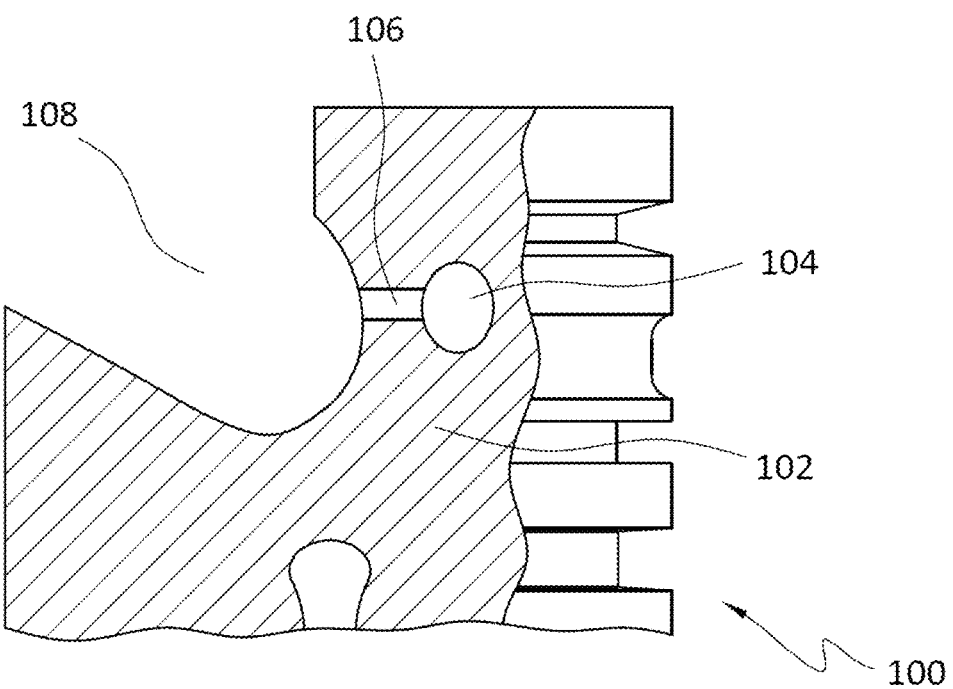
FIG. 1B is an elevational cutaway view showing the piston comprising micro-chambers of FIG. 1A.

FIGS. 1A and 1B show an embodiment of a piston comprising micro-chambers that comprise at least one vent. The piston 100 may have a main body portion 102 that defines within and/or through at least a partial thickness thereof one or more micro-chambers 104. The micro-chambers 104 may comprise one or more corresponding vents 106 that connect the micro-chambers 104 to a reaction recess 108. The micro-chambers 104 may have any suitable number, configuration, and size. For example, in the depicted embodiment the micro-chambers 104 may be configured to substantially surround a substantially circular reaction recess 108 defined within a thickness of the main body portion 102. The vents 106 may be regularly spaced at intervals around the reaction recess 108. In embodiments, the vents 106 are distributed asymmetrically and/or irregularly, in a discrete section of the piston 100, or otherwise.

As described above, the micro-chambers 104 may be configured to produce and preserve radicals from the reaction of a previous combustion cycle, such as an immediately preceding cycle or cycles, in a frozen equilibrium, including large fractions of $H_2O_2$ and $HO_2$. With regards to a reaction mechanism in view of $H_2$, certain of the principle reactions involved are:

$$H_2 + OH \rightleftharpoons H_2O + H \text{(IGNITION)} \quad R(1):$$

$$H + O_2 + M \rightleftharpoons HO_2 + M \quad R(2):$$

$$HO_2 + H \rightleftharpoons OH + OH \quad R(3):$$

$$HO_2 + HO_2 \rightleftharpoons H_2O_2 + O_2 \quad R(4):$$

$$H_2O_2 + M \rightleftharpoons OH + OH + M \quad R(5):$$

The reaction mechanism responsible for $H_2$ radical ignition in the combustion chamber is complex and changes with temperatures and pressures. At the onset of ignition, at combustion chamber low temperatures of up to 1100K, 1000K, and even as low as 400 K, it was found that R(1) and R(2) dominate, while R(5), R(3) and R(4) contribute significantly. Chain initiation is mainly due to R(5) which produces abundant OH radicals from the $H_2O_2$.

During conventional $H_2$ fuel-combustion (non-radical ignition) calculations of R(5), when $H_2O_2$ is not available, it has been surprisingly found that chain initiation is due to reactions requiring much higher compression ratios (19:1) to ensure conventional auto ignition. In addition, these compression-ratio reactions are also much slower than chain initiation via R(5) enabled by the presence of adequate $H_2O_2$ at lower temperatures corresponding to lower compression ratios. Thus when $H_2O_2$ is amply available (as in properly controlled SCAI), R(5) dominates the chain initiation process, resulting in a faster and more-efficient reaction overall, as OH is a limiting reactant for R(1).

Autoignition is caused by $H_2O_2$ and $HO_2$ rapidly exchanging themselves to produce the OH necessary to propagate and sustain R(1). That is, autoignition can take place at a lower compression ratio via the radicals produced by the micro-chamber of the previous cycle, and remaining OH in the micro-chambers 104 helps facilitate autoignition in the subsequent cycle. This advantageously takes place at much lower temperatures than those normally required for the compression ignition of H2.

In embodiments, autoignition is enabled by the increase of temperature from the forward progress of exothermic reaction R(1), and an acceleration in chain initiation that leads to faster chain propagation and chain branching. This is further enabled by the unique geometry of the micro-chambers 104 in the piston 100 of FIGS. 1A, 1B.

Simulations run at a low compression ratio of 11.3:1 for three engine cycles all starting from the same initial conditions including 20% exhaust gas recirculation indicate that while a first cycle using a lean relative air/fuel ratio (lambda) of 1.3 failed to ignite the fuel in the main combustion chamber despite the production of radical species in the micro-chambers, a second cycle using a lambda of 1.4, in which carryover of species and unburned fuel from the first cycle effectively reduced lambda to near 1.0, facilitated robust ignition. While nearly all of the radicals are consumed during combustion, the micro-chamber has been found to produce and preserve a frozen equilibrium with sufficiently large fractions of $H_2O_2$ and $HO_2$ to facilitate low-temperature ignition in subsequent cycles. This advantageously accelerates the speed of the reaction for subsequent cycles and enables and/or achieves the use of more conditions, including lower temperature.

The third cycle represents the full SCAI direct-injection cycle. The engine is ignited at the lower compression ratio (11.3:1) via the radicals produced and retained by the micro-chamber of the previous cycle and with the assistance of a main-chamber OH produced in the main combustion chamber. Additionally, OH produced in the main chamber of the present cycle helps in the generation of radicals for use in the next cycle. Thus, the higher concentrations of $H_2O_2$ and $HO_2$ facilitates much earlier and faster ignition of the hydrogen through R(1), facilitating ignition at much lower temperature than otherwise possible through compression ignition processes using H2.

Accordingly, it has been found that the presence of much higher-than-normal concentrations of $H_2O_2$ and $HO_2$ provided by micro-chamber cool-flame processes of preceding cycle radical carryover facilitates earlier and faster ignition of hydrogen through R(1), taking place at temperatures lower than those normally required for the compression ignition of $H_2$. That is, the presence of $H_2O_2$ and $HO_2$ enables ignition at lower compression temperatures by causing an increase in temperature due to enabling the exothermic reaction R(1) and due to acceleration in chain initiation, and the resulting faster chain propagation and chain branching. $H_2O_2$ and $HO_2$, moreover, are retained due to the unique geometry of the micro-chambers of the piston shown in FIGS. 1A, 1B, which allows the $H_2O_2$ and $HO_2$ to remain separate from the main-chamber-generated OH during the last part of the power stroke, and essentially separated during most of the exhaust stroke of an operating SCAI engine.

Figure 6A:
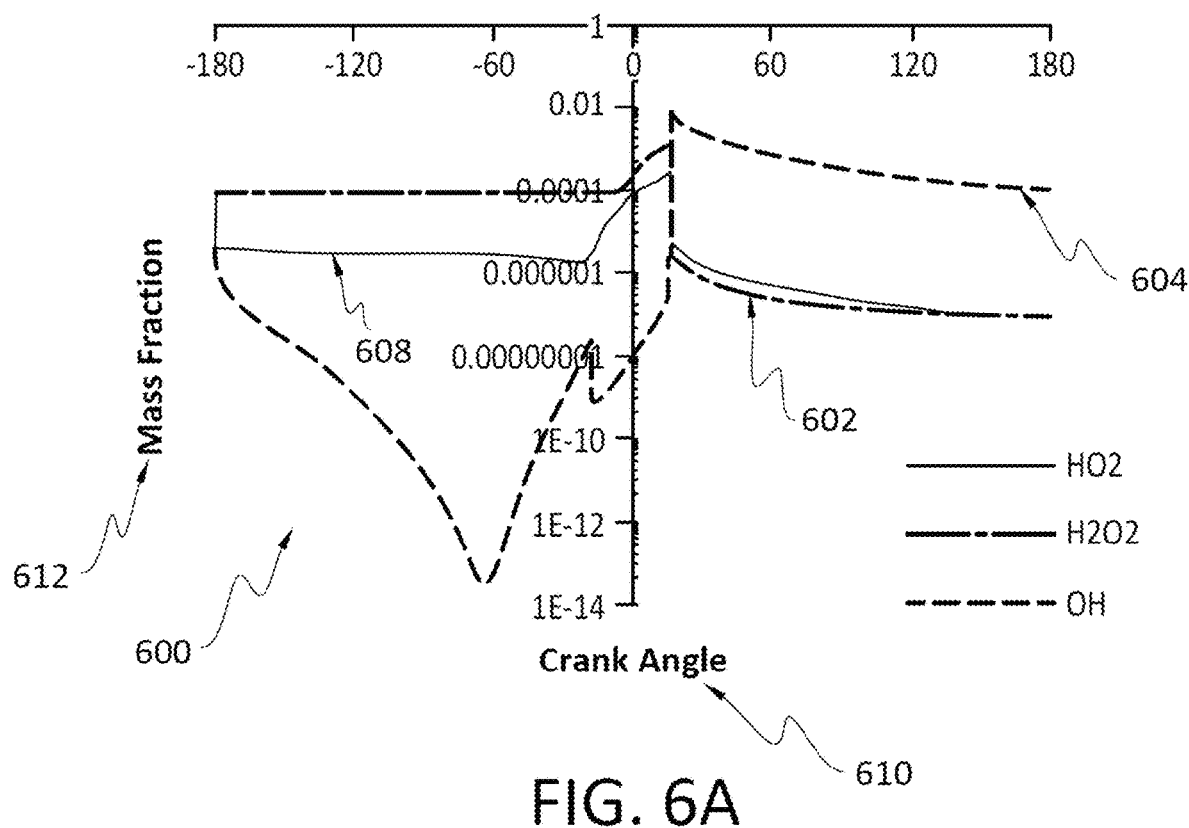
FIG. 6A is a graph showing mass fractions of radical particles in a main combustion chamber as a function of crank angle degree according to an embodiment.
Figure 6B:
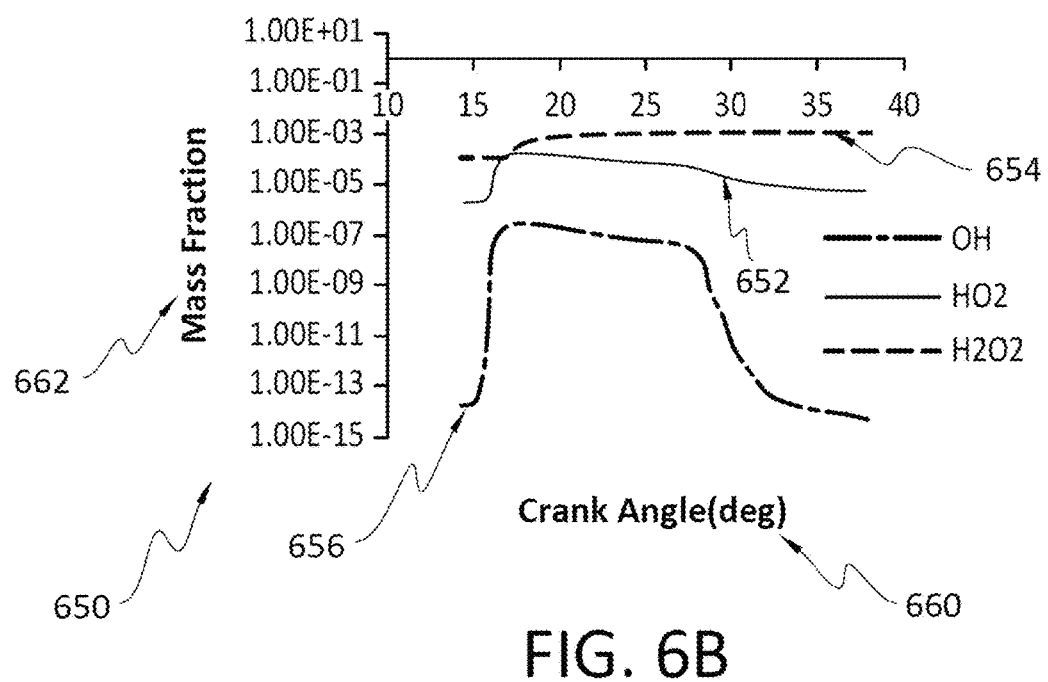
FIG. 6B is a graph showing mass fractions of radical particles in a micro-chamber as a function of crank angle degree according to an embodiment.

This is shown in FIG. 6A, where the main-chamber 600 mass fraction 612 of OH 604 peaks just after TDC (i.e. 0 crank angle degrees 610) and decreases corresponding to the decreasing proportions of $H_2O_2$ 602 and $HO_2$ 608. Correspondingly, as shown in FIG. 6B, the micro-chamber 650 mass fraction 662 of $H_2O_2$ 654 is steady and $HO_2$ 652 decreases slightly after TDC (i.e. 0 crank angle degrees 660), whereas the mass fraction of OH 656 quickly falls.

As described above, the remaining $H_2O_2$ and $HO_2$ radicals facilitate decomposition in the main combustion chamber which facilitates low-temperature ignition relative to other approaches. This is due to the exothermic reactions facilitated by the increase in temperature from the decomposition to OH as well as the acceleration in chain initiation which leads to faster chain propagation and chain branching, all of which is enabled by the geometry of the micro-chambers.

Likewise, low-temperature and lower-compression-ratio radical ignition of carbon compounds such as $CH_4$ is enabled by the radicals produced in and retained by the micro-chambers 104 of the piston 100. This is also possible for other carbon-based fuels. The reactions are according to the following suite for methane and all carbon-based fuels:

$$CH_4 + OH \rightleftharpoons CH_3 + H_2O \text{(IGNITION)} \quad R(6):$$

$$CH_3 + HO_2 \rightleftharpoons CH_3O + OH \quad R(7):$$

$$H + O_2 + M \rightleftharpoons HO_2 + M \quad R(8):$$

$$H_2O_2 + M \rightleftharpoons OH + OH + M \quad R(9):$$

$$CH_3O + O_2 \rightleftharpoons CH_2O + HO_2 \quad R(10):$$

At the approximate onset of autoignition at the main combustion chamber temperature of approximately 980K and at 2.5° CA BTDC, reactions R(6), R(7), and R(8) become dominant while R(10) and R(9) contribute significantly. Chain initiation is primarily due to R(9) in combination with R(6) and R(7), partly due to the abundance of OH product from R(9), which drives R(6) forward. The combined rates of R(7) and R(9) are larger than R(6) and remain so for 300° C. while R(9) is releasing OH radicals and is highly exothermic.

That is, the thermal decomposition of $H_2O_2$ via R(9) is responsible for the hot ignition process of R(6) and simultaneous global ignition of the entire charge, causing combustion with little or no flame front in the main combustion chamber. This serves to further reduce the production of emissions such as soot. This is further facilitated by the geometry of the micro-chambers, as the $H_2O_2$ and $HO_2$ generated remain in the micro-chamber, and thus remain separate from the main cylinder and the OH generated therein, during the last part of the power stroke and remain substantially separate during most of the exhaust stroke.

Additionally, the reactions described above facilitate an increased heat release rate compared to spark-injection (SI) and compression-injection (CI) engines, which shortens the time for achieving complete combustion and reduces the heat loss. Accordingly, an engine management system and method according to the disclosed embodiments may comprise an internal combustion engine configured with at least one piston having at least one micro-chamber and vent configured to carry out at least one of the reactions described above, and a control system and method that controls and synchronizes the operation of components of the internal combustion engine to enable a global low-temperature operation that minimizes emissions.

Figure 2A:
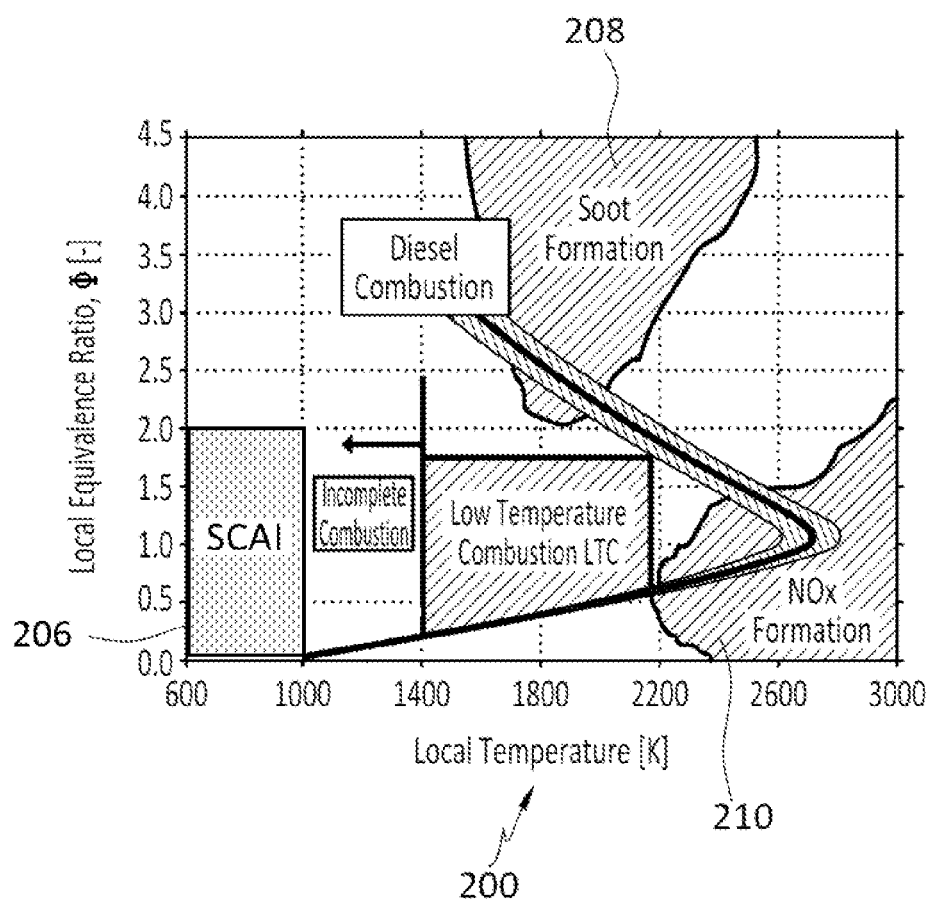
FIG. 2A is a graph showing the operation of SCAI relative to local temperature and local equivalence ratio.

As shown in FIG. 2A, a graph 200 defining low temperature and lean fuel or equivalence ratio bounds where low-temperature radical ignition can exist is presented, with "Local Temperature [K]" on the x-axis and "Local Equivalence Ratio, Φ[–]" on the y-axis. Also shown are regions where soot particulates and NOx are formed in a diesel direct injection engine. The data for the graph 200 were derived from simulations coupled with a soot formation model using n-heptane at a pressure and time scale relevant for internal combustion engines, particularly for HCCI engines, and from SCAI test data defining equivalent ratio boundaries. The regions of soot formation 208 and NOx formation 210 were developed using the simulations based on the performance of a diesel engine. As seen, region 206 corresponds to SCAI equivalence ratio boundaries. It will be understood that the SCAI equivalence ratio boundaries 206 are at a lower temperature and well outside the regions 208, 210 whereat soot and NOx formation are likely.

For instance, a local equivalence ratio of 0.56 may correspond to CO readings between 0.01 and 0.02%, HC of less than 20 PPM, Lambda above 1.8 and oxygen above 10%. The SCAI engine enabled by the engine management system and method embodiments is therefore a lean-burn process. Moreover, a no-throttle SCAI engine further allows high efficiency with no pumping loss while reducing load compared to a SI throttled engine that causes efficiency losses under such conditions.

Figure 2B:
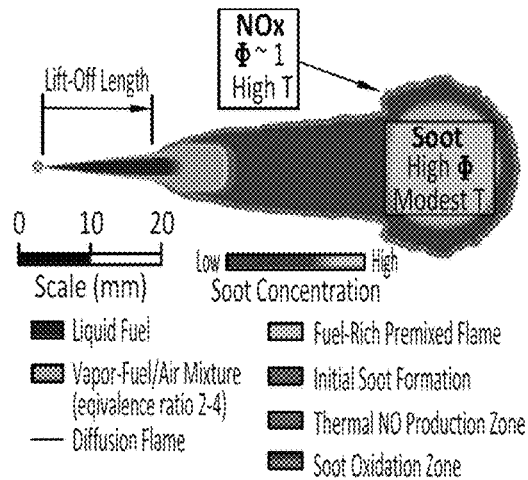
FIG. 2B shows conditions where soot particles and NOx are formed.

The boundaries defined as shown in FIG. 2 may be utilized by the controller in conjunction with inputs from one or more instruments or sensors and by controlling one or more engine outputs as described herein to ensure that performance of an engine according to embodiments of the disclosure remains within optimized bounds of, for example, equivalence ratio and temperature to achieve, for example, reduction of emissions and improvement of performance.

Figure 3:
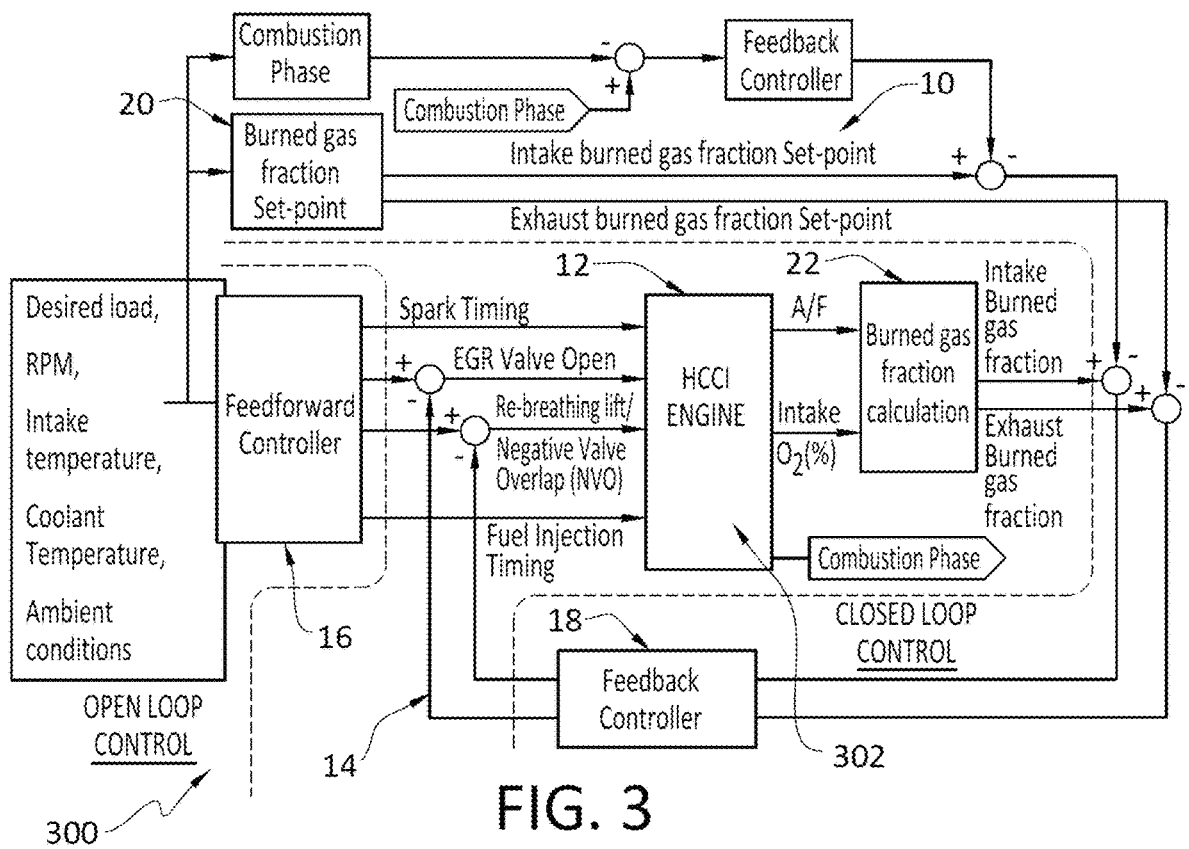
FIG. 3 is a simplified diagram of a control system according to HCCI engines.

FIG. 3 shows a closed loop design used for a control system 302 used for HCCI combustion control 300, as described in U.S. Pat. No. 7,128,063, granted Oct. 31, 2006. As described herein, the control system 302 of FIG. 3 may be a closed-loop design and may be configured to optimize performance of an HCCI process. The control system 302 indicates that control may be valuable in an engine and has been achieved for HCCI processes, but effective control remains elusive for SCAI processes. A control system as described according to embodiments of the present disclosure addresses this need and overcomes the limitations of the control system 300.

Figure 4:
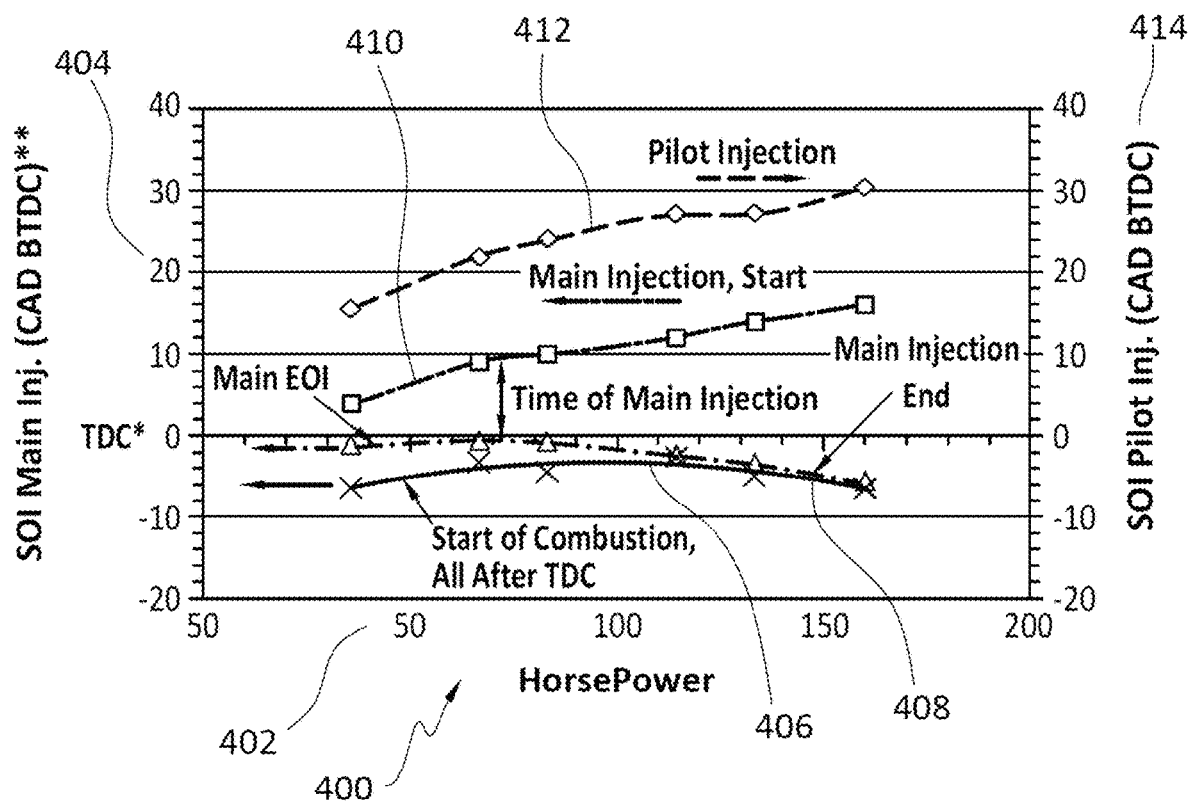
FIG. 4 is a graph showing the performance of an SCAI engine using the control system and method according to an embodiment.

FIG. 4 shows a graph 400 depicting a relationship between TDC 404 and a horsepower 402 corresponding thereto. The graph 400 shows typical results that provide the data for input into a control system according to the embodiments using main injection timing 410 and pilot injection timing 414 vs. horsepower 402 for JET-A fuel. The injection timing is measured relative to crank angle degrees (CAD) before TDC (BTDC). The SCAI full-load average brake specific fuel consumption is 219 g/kWh, with best power air/fuel ratio at 26.5:1 and Lambda at 1.8. In particular, the start of combustion 406 after TDC varies over the horsepower 402 as shown. The end of injection (EOI) 408 likewise decreases over the horsepower 402 as shown.

By contrast, the main injection start 410 and the pilot injection 412 behave as shown, with increased horsepower corresponding to timing the injection at more crank angle degrees before TDC, particularly for pilot injection. Note that the combustion occurs after TDC, while the end of injection finishes before the beginning of combustion. Thus for all horsepower, the start of combustion 406 in engine management system and method embodiments advantageously occurs after TDC, improving the performance of the engine so controlled. The data shown in graph 400 may be provided in a storage unit of the control system to control the injection timing so as to ensure that combustion starts after TDC.

Figure 5:
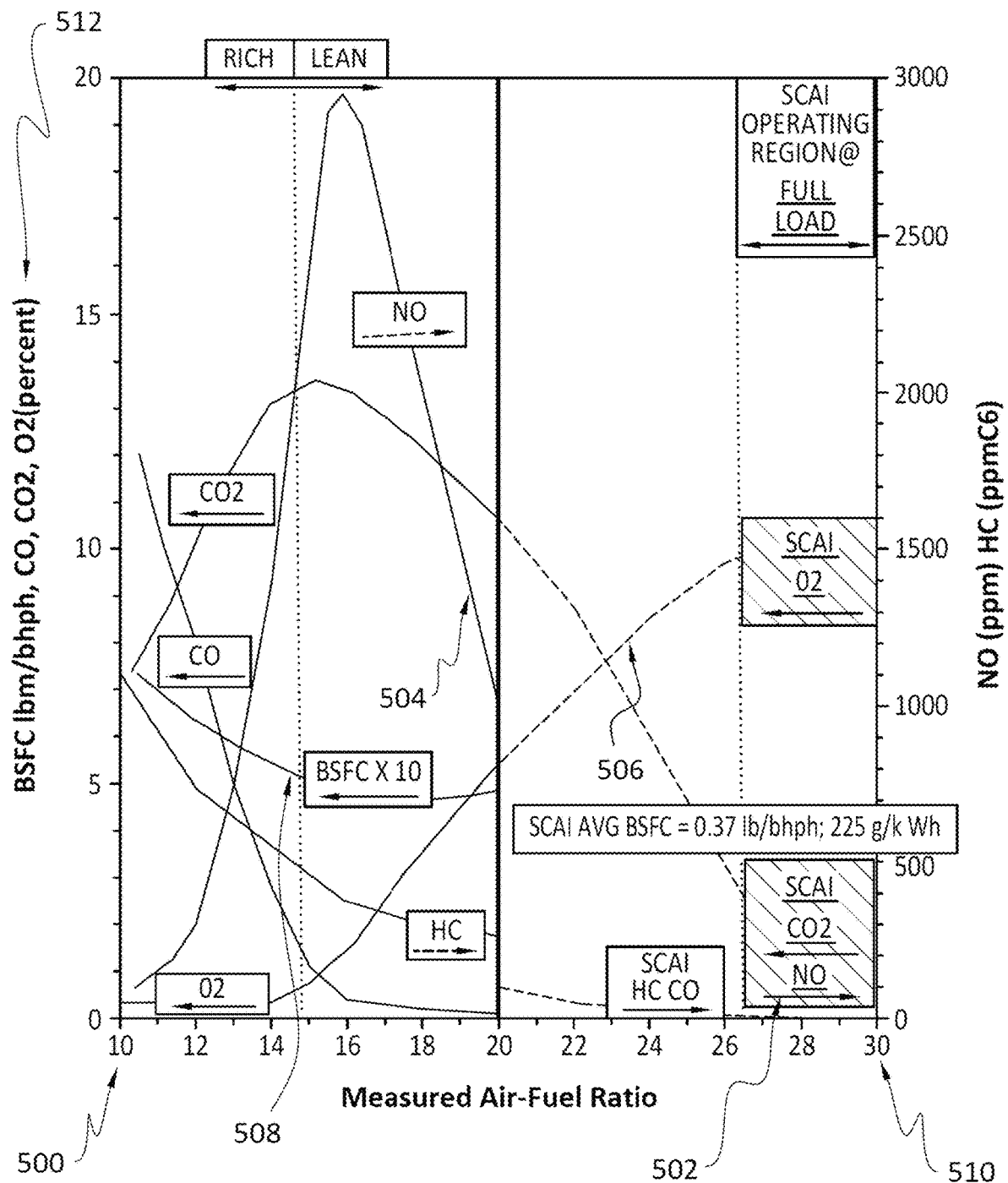
FIG. 5 is a graph showing emissions generated using an SCAI engine using the control system and method according to an embodiment.

FIG. 5 shows a graph 500 indicating $CO_2$ reductions 502 from stoichiometric using SCAI. In particular, the graph 500 shows performance in terms of brake specific fuel consumption as well as emissions production in percent or ppm 512 as a function of the measured air-fuel ratio 510. The $CO_2$ reductions may be approximately 86% reduced, from approximately 13.6% for standard diesel stock engine performance to approximately 1.9% for a properly controlled SCAI engine according to the embodiments.

Similarly, NO reductions 504 are shown as being reduced by approximately 90%. By contrast, $O_2$ 506 is increased from 1 to 15%. Brake specific fuel consumption ("BSFC") 508 is reduced by 21%. The test data from FIG. 5 define the regions for air/fuel ratio, BSFC, $O_2$, and CO which are used to define the local equivalence boundaries shown in FIG. 2. Surprisingly, the BSFC attained with heavy fuels below that required or suitable for SI gasoline engines facilitates the use of light-weight SCAI engines with cylinder pressures approximating those of gasoline engines.

Accordingly, it is clear that SCAI, if properly controlled, advantageously reduces emissions and improves $O_2$ and performance. A control system according to the depicted and described embodiments may synchronize inputs to the engine, such as engine rpm, load demand, ambient pressure, pressure, and humidity, among other factors, to manage the end of injection and causing the start of combustion to occur after TDC, this enabling peak cylinder pressure generally on the order of SI engines at the optimal crank angle so as to produce maximum torque or other strategic benefits. Further, the control system may ensure that the fuel injection is completed before TDC and prior to the start of combustion, which is timed to occur after TDC.

The control system of the disclosure may manage the start of each pilot and main fuel injection before a piston of an engine reaches its TDC position such that resulting combustion is fully and dynamically controllable at all loads and speeds. The control system can further ensure that the combustion is stable under operating conditions, with additional benefits of the control system and method of the embodiments is a coefficient of variation (COV) of indicated mean effective pressure (IMEP) of less than 5% under operating conditions for compression ratios less than 16:1, this enabling low-temperature chemistry-decomposition kinetics. In embodiments, the control system of embodiments allows retaining a brake specific fuel efficiency of over 30% over all RPM. This may be accomplished for the purpose of controlling the operation of an engine to a temperature of less than or equal to 1000K and an equivalence ratio below 0.56.

The control system is configured to manage the end of injection causing start of combustion such that combustion begins after TDC. This enables peak cylinder pressure generally on the order of SI engines at the optimal crank angle location to produce maximum torque, for example. This also facilitates the start of combustion to occur after end of injection in flameless global radical ignition of all the fuel such that the combustion products contain minimal $CO_2$, water, and other emissions, such as NOx, UHC, and CO. Further, the control system is configured to control the peak cylinder pressure location after the maximum motoring pressure location by injection timing at all loads and speeds, and with a fixed compression ratio.

As described above, the control system can manage the intake manifold pressure. This may be based on engine rpm, load demand, ambient pressure, pressure, humidity, and other factors. The control system further can manage cold engine start by adjusting the intake manifold heater, conventional SI, or both based on the ambient temperature and pressure to effect a transition to SCAI. Special cold-start means such as a device situated in the manifold and configured to vaporize fuel, which is especially important at low temperature, such as sub-zero temperatures.

Further, the control system can be configured to control the fuel injection pressure with injection timing, length of injection, number of injections, and all inputs to the processor using optimized stored values together with immediate values. This can ensure that in order for the fuel spray to place the right amount of fuel to hit the vent leading into the micro-chamber at the highest rpm and load, the swirl in the cylinder is low.

It is has been surprisingly found that emissions and fuel consumption can be reduced, and an engine can be operated within the boundaries shown in FIG. 3, by providing an engine that comprises a control system according to the embodiments as well as one or more of an intake port, an air intake manifold, means for supercharging and/or turbocharging enabling air flow above stoichiometric at all engine rpm, cooling means, exhaust means, and direct-injection fueling means.

The engine provided may be a reciprocating fixed-compression-ratio internal combustion engine. As described above, the engine may be configured to cooperate with or may include a control system according to the disclosure. The engine may comprise a crankshaft having connecting rods attached to pistons comprising micro-chambers, as described in U.S. Pat. No. 5,862,788, granted Jan. 26, 1999, and U.S. Pat. No. 6,178,942, granted Jan. 30, 2001, each of which is incorporated herein by reference in its entirety. The control system may be provided as an electronic control unit embedded in automotive electronics that controls one or more electrical systems or subsystems with a vehicle.

The engine may operate on an Otto cycle with external energy input reduced by the internal energy recycled from the previous combustion cycle, as enabled by the provision of micro-chambers in the pistons. The outflow of decomposition products from the micro-chambers causes in-cylinder global radical ignition after TDC with no flame-front in air-fuel compositions greater than stoichiometric (e.g.

>26.5:1) and by direct injection of any fuel with no dependence on octane or cetane rating. The precise location of the peak cylinder pressure with respect to TDC by radical ignition is enabled by process control of one or more of pilot, main, or both, controlling the injection timing, pressure, etc.

The intake port may be configured to have low swirl, this enabling air flow capacity above stoichiometric. The air intake manifold may comprise no throttle means. The cooling means may be of reduced capacity due to low heat rejection in view of the improved engine efficiency. The exhaust means may contain minimal or even no aftertreatment devices. The direct-injection means may enable a fuel-spray diameter controlled by the injection pressure to impinge on micro-chamber vents over all engine operating conditions. The direct-injection means may further enable the number, length, and/or flow capacity of injection pulses to be regulated according to the fuel used. The direct-injection means may yet further enable the number, duration, and flow capacity of injection pulses to be regulated according to load-speed demand.

Additionally, the engine may be configured to control an injector orifice size and the location of injector spray allowing entry of predetermined limited fuel with respect to the micro-chamber vents of the pistons. Further, a starting element may be located in the intake manifold or in the cylinder to facilitate cold start and low-load operation. It is clear that the control system embodiments are multi-dimensional and serve to maintain SCAI engine performance with a local equivalence ratio of 0.56 and local temperature boundaries of less than or equal to 1000K using, for example, a closed-loop feedback protocol.

It is of particular benefit that an engine management system and method of using the same according to the embodiments of the disclosure further allows for the exclusion of additional hardware, for no variable compression ratio, for no-throttle lean burn with equal or greater power, no flame-front (which avoids the production of $CO_2$, NOx, soot, CO, and HC), no use of exhaust gas recirculation (unless needed at very low temperatures), and control by injection timing at all loads and speeds.

It is known that stock diesel compression ratio is typically above 17:1 out of necessity for compression ignition by oxidation of fuels with distillation curves above those of gasoline. That oxidation process at high temperatures is highly dependent on fuel composition and takes part in two phases: the first phase of pre-mix, followed by droplet combustion, extending the time of combustion. This creates soot particulates which must be removed by filters and NOx which must be removed by chemical means, and $CO_2$ which is emitted to atmosphere.

By contrast, an SCAI process controlled by a control system according to the disclosed embodiments must be below that of the diesel process, typically at a maximum of 12.5:1, with radical ignition decomposition low-temperature pathways that are not available at diesel compression rations, and is not dependent on fuel composition, including whether carbon-based fuels are present in contrast to H2. Combustion is ultra-lean with air/fuel ratios starting at 26.5:1, lambda is 1.8 at max power and increasing as less than full power. This results in $CO_2$ being minimized and only trace amounts of NOx, soot particulates and CO.

Accordingly, an SCAI process controlled by a control system according to the disclosed embodiments can be a low-temperature process at, for example, 150° C. lower than HCCI processes and without being fuel specific (i.e. not dependent on octane or cetane rating).

An SCAI-enabled engine comprising a control system according to the disclosed embodiments may advantageously consume less gasoline-equivalents than a standard gasoline engine or even a hybrid electric vehicle. The fuel economy standard for model years 2012-2016 uses a common conversion factor of 8,887 grams of $CO_2$ emissions per gallon of gasoline consumed, or 19.59 lbs, at an air/fuel ratio of 14.7 and a lambda of unity. For drivers that drive 10,000 miles per year at a fuel efficiency of 25 miles per gallon, $CO_2$ produced is then 3.56 tons per year.

Repeating this calculation for an SCAI engine using a control system according to the embodiments and having a $CO_2$ reduction from stoichiometric of 86% and BSFC fuel reduction of 21% gives: gas consumption of 314.8 gallons per year, or 0.43 tons of $CO_2$ per year.

Figure 7:
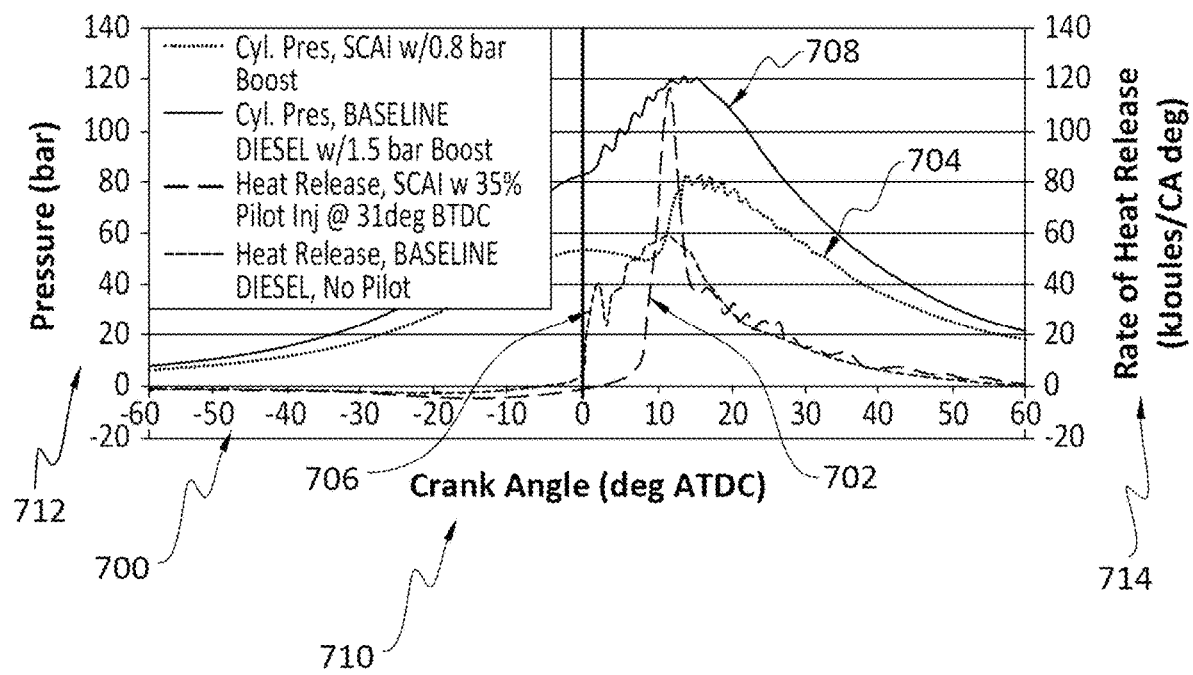
FIG. 7 is a graph showing pressure and heat release as a function of crank angle degree for a diesel engine compared to an SCAI engine according to an embodiment of the disclosure.

The advantages of an SCAI engine controlled using a control system according to embodiments of the disclosure is further shown in FIG. 7. A comparison 700 of the cylinder pressure and rate of heat release (RHR) for SCAI compared to a standard diesel engine, both turbo-charged, is shown. The CAD 710 is on the x-axis and the pressure 712 and RHR in kJ/CAD 714 are shown on the y-axis. The SCAI boost pressure is 0.8 bar, while the diesel boost pressure is 1.5 bar. Both engines run lean at CO=0.02%, lambda approximately 1.8, and at full load at 2000 RPM on JP8 military fuel with main injection at ten degrees before TDC. The peak cylinder pressure for the diesel engine 708 is at 120 bar and is at 80 bar for the SCAI engine 704 (in the range of normal gasoline engines).

Regarding the maximum rate of heat release, the diesel engine 706 is nearly 60 KJ/CAD and is two-phase. By contrast, the SCAI engine 702 is single-phase at nearly 120 KJ/CAD. Thus whereas the diesel engine 706 RHR lasts from before TDC to near 20 degrees, the SCAI RHR starts around 8 degrees, occurring about 50% faster.

By providing an engine management system and method according to the disclosed embodiments, the problem of existing engine types having poor emissions profiles and limited performance ranges, particularly regarding temperature, is advantageously addressed. By providing an engine management system including a controller for an internal combustion engine comprising a piston having at least one microchamber as described, and by controlling one or more of a injector timing, injector pressure, injector spray coverage with respect to piston micro-chamber vents according to a detected parameter such as engine rpm, load, or otherwise, a global low-temperature decomposition chemical reaction producing controlled maximum in-cylinder temperature below the conditions necessary for generating oxides of nitrogen and at a fuel/air composition below that conditions necessary for forming soot particulates is enabled.

Further, the engine management system and method embodiments extend the limited speed/torque operating region of direct-injected compression ignition engines using HCCI to overcome lack of combustion stability, creation of excess emissions, and excessive fuel consumption generally limited by stoichiometric operation and engine roughness with high COV of IMEP. In embodiments, the engine management system and method embodiments operate on a regenerative cycle which has the standard external energy input reduced by the internal energy recycled from the previous combustion cycle, due to the presence of radicals in the micro-chambers.

The engine management system and method embodiments advantageously ensure that during a subsequent engine cycle, micro-chamber cool-flame outflow of decomposition products (i.e. chemical radicals) causes in-cylinder global radical ignition after TDC with no or little flame front in air/fuel mixture compositions greater than stoichiometric with best power at air/fuel ratios greater than 26.5:1. The system and method control the peak cylinder combustion pressure to occur at the optimal crank angle location for increased efficiency by regulating, for example, a main fuel injection pressure, timing of start and end of injection, and pilot injection as necessary to convert minimal fuel quantity into useful work stably and in minimal time producing water, minimal $CO_2$, negligible $NO_x$, UHC, CO, and while facilitating reduced fuel consumption.

The system and method are particularly advantaged in that the management of turbo airflow and fuel suppled by direction injection to the main combustion chamber recess insuring the injector spray impingement and quantity is optimized with respect to the reaction micro-chambers using closed-loop process control as described herein to control one or all engine functions and ensuring a predetermined crank angle location and time to ensure that combustion occurs within a predetermined equivalence ratio and temperature boundary. The system and method may manage the start of each pilot and main-fuel injection before the piston reaches TDC to achieve COV of IMEP of less than 5% and for compression ratios less than 16:1 to enable low-temperature chemistry decomposition kinetics.

The system and method further manage the end of injection causing a start of combustion to occur after TDC to produce maximum torque and inherent cool-flame properties with flame-less, global radical ignition of all the fuel injection such that the combustion products contain minimal quantities of CO2, water, and other emissions as described herein. Engine cold start is managed using an intake manifold heater, conventional SI, or both according to ambient temperature and pressure.

While the disclosure discusses embodiments for direct-injection internal combustion engines, control system and method embodiments of the disclosure may be used with other types of engines.

Not necessarily all such objects or advantages may be achieved under any embodiment of the invention. Those skilled in the art will recognize that the invention may be embodied or carried out to achieve or optimize one advantage or group of advantages as taught without achieving other objects or advantages as taught or suggested.

The skilled artisan will recognize the interchangeability of various components from different embodiments described. Besides the variations described, other known equivalents for each feature can be mixed and matched by one of ordinary skill in this art to provide a control system and method under principles of the present invention. Therefore, the embodiments described may be adapted to engines having other process configurations.

Although the invention has been disclosed in certain preferred embodiments and examples, it therefore will be understood by those skilled in the art that the present invention extends beyond the disclosed embodiments to other alternative embodiments and/or uses of the invention and obvious modifications and equivalents. It is intended that the scope of the present invention disclosed should not be limited by the disclosed embodiments described above, but should be determined only by a fair reading of the claims that follow.

The invention claimed is:

1. An engine management system comprising:
an internal combustion engine including at least one piston comprising at least one micro-chamber and a corresponding vent; and
a control system,
wherein the control system
receives one or more readings from one or more sensors arranged on or in the internal combustion engine;
receives one or more operational parameters of the internal combustion engine,
wherein the one or more readings and the one or more operation parameters are indicative of a determinable in-cylinder temperature and an equivalence ratio;
determines the in-cylinder temperature and the equivalence ratio;
controls an operation of the internal combustion engine; and
based on the controlled operation of the internal combustion engine, determines whether a global low-temperature decomposition chemical combustion reaction occurs within at least one cylinder of the internal combustion engine,
wherein the global low-temperature decomposition chemical reaction occurs
at a temperature within a range of greater than or equal to 600 K and less than or equal to 1000 K, and
at an equivalence ratio within a range of greater than or equal to 0.06 and less than or equal to 2.0.

2. The engine management system of claim 1, wherein the at least one micro-chamber and the at least one corresponding vent of the at least one piston is configured to store at least one species of radical from a first combustion cycle to at least one subsequent combustion cycle.

3. The engine management system of claim 1, wherein the one or more engine readings comprises one or more of a manifold absolute pressure, manifold air temperature, intake air temperature, instant engine load, exhaust gas temperature, mass of air flow, mass of fuel flow, crank shaft position, cam shaft position, engine coolant temperature, and oxygen sensor.

4. The engine management system of claim 1, wherein the one or more sensors may comprise one or more of a thermocouple, a pressure transducer, a fuel flowrate meter, an rpm meter, an air flow sensor, and a lambda sensor.

5. The engine management system of claim 1, wherein the one or more operational parameters of the internal combustion engine include air-fuel ratio, idle speed, variable valve timing, electronic valves, fuel rate, fuel pressure, start and stop of pilot, injection timing, intake manifold air pressure, exhaust gas recirculation, and intake manifold temperature.

6. The engine management system of claim 1,
wherein the control system is configured to
control the operation of the internal combustion engine to control at least one emission of the internal combustion engine, including one or more of a CO, $NO_x$, HC, or $CO_2$ emission.

7. The engine management system of claim 6, wherein the at least one emission controlled by the engine management system is a CO emission, which is controlled below 1.0%.

8. The engine management system of claim 6, wherein the at least one emission controlled by the engine management system is a NO, emission, which is controlled below 100 ppm.

9. The engine management system of claim 6, wherein the at least one emission controlled by the engine management system is a $NO_x$ emission, which is controlled to 50% or lower than stoichiometric.

10. The engine management system of claim 6, wherein the control system is configured to manage an intake manifold pressure according to at least one of engine rpm, load demand, ambient temperature, ambient pressure, and ambient humidity.

11. The engine management system of claim 6, wherein the control system is configured to manage a maximum combustion pressure by adjusting at least one of a fuel injection pressure, a timing start, and an end of injection.

12. The engine management system of claim 1, wherein the global low-temperature decomposition chemical combustion reaction occurs at an equivalence ratio within a range of greater than or equal to 0.06 and less than or equal to 0.56.

13. The engine management system of claim 1, wherein the one or more readings and the one or more operation parameters are further indicative of an air/fuel ratio,
wherein the control system further determines the air/fuel ratio, and
wherein the global low-temperature decomposition chemical combustion reaction is further characterized by occurring at an air/fuel ratio within a range of greater than or equal to 26.5 and less than 30:1.

14. A method for controlling an internal combustion engine, the method comprising the steps of:
providing an internal combustion engine comprising at least one piston including at least one micro-chamber and corresponding vent;
providing a control system;
providing at least one sensor in communication with the internal combustion engine and the control system;
receiving by the control system one or more readings from the at least one sensor;
receiving by the control system one or more operational parameters of the internal combustion engine,
wherein the one or more readings and the one or more operation parameters are indicative of a determinable in-cylinder temperature and an equivalence ratio;
determines the in-cylinder temperature and the equivalence ratio;
controlling by the control system an operation of the internal combustion engine; and
based on the controlled operation of the internal combustion engine, determining whether a global low-temperature decomposition chemical combustion reaction occurs within at least one cylinder of the internal combustion engine
wherein the global low-temperature decomposition chemical reaction occurs
at a temperature within a range of greater than or equal to 600 K and less than or equal to 1000 K, and
at an equivalence ratio within a range of greater than or equal to 0.06 and less than or equal to 2.0.

15. The method of claim 14, wherein controlling by the control system includes the control system controlling a start of combustion to occur after the at least one piston passes a top dead center position.

16. The method of claim 14, wherein controlling by the control system includes the control system controlling an end of injection to be before the start of combustion or before the top dead center position.

17. The method of claim 14, wherein the at least one micro-chamber retains a frozen equilibrium of at least one radical species including $H_2O_2$ or $HO_2$ from a first combustion cycle to at least one subsequent combustion cycle.

18. An engine management system comprising:
an internal combustion engine including at least one piston comprising at least one micro-chamber and a corresponding vent and
a control system,
wherein the control system
receives one or more readings from one or more sensors arranged on or in the internal combustion engine;
receives one or more operational parameters of the internal combustion engine,
wherein the one or more readings and the one or more operation parameters are indicative of a determinable in-cylinder temperature and an air/fuel ratio;
determines the in-cylinder temperature and the air/fuel ratio;
controls an operation of the internal combustion engine; and
based on the controlled operation of the internal combustion engine, determines whether a global low-temperature decomposition chemical combustion reaction occurs within at least one cylinder of the internal combustion engine,
wherein the global low-temperature decomposition chemical reaction occurs
at a temperature within a range of greater than or equal to 600 K and less than or equal to 1000 K, and
at an air/fuel ratio within a range of greater than or equal to 26.5 and less than 30:1.

* * * * *